United States Patent
Pellegrin et al.

(10) Patent No.: US 6,981,006 B2
(45) Date of Patent: Dec. 27, 2005

(54) SCHEMA-BASED FILE CONVERSION

(75) Inventors: Steve Pellegrin, Seattle, WA (US); Robin Briggs, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 149 days.

(21) Appl. No.: 09/808,533

(22) Filed: Mar. 14, 2001

(65) Prior Publication Data

US 2002/0174135 A1 Nov. 21, 2002

(51) Int. Cl.$^7$ .............................................. G06F 17/30
(52) U.S. Cl. ........................................ 707/203; 707/200
(58) Field of Search ............................. 707/1–10, 200, 707/203, 206; 709/217

(56) References Cited

U.S. PATENT DOCUMENTS

| | | | | |
|---|---|---|---|---|
| 5,911,776 A | * | 6/1999 | Guck ........................ | 709/217 |
| 6,094,684 A | * | 7/2000 | Pallmann ................... | 709/227 |
| 6,430,556 B1 | * | 8/2002 | Goldberg et al. ............ | 707/4 |
| 6,615,212 B1 | * | 9/2003 | Dutta et al. ................ | 707/10 |

OTHER PUBLICATIONS http://www.niksula.cs.hut.fi/~tik76143/exercises_00/exercises_3.html—Solutions of execises for a relational database schema.
http://gizmo.lbl.gov/DM_TOOLS/PAPERS/DMD/node14.html—Schema Conversion Criteria.
http://www.fdgroup.com/research/universe/d4-5-4.htm—Project LIB–4032/B—UNIverse—Large Scale Demonstrators for Global, Open Distributed Library Services Explain Database Service.

* cited by examiner

*Primary Examiner*—Frantz Coby
*Assistant Examiner*—Marc Filipczyk
(74) *Attorney, Agent, or Firm*—Fish & Richardson P.C.

(57) ABSTRACT

Methods and apparatus for performing file conversions. In one aspect of the invention, a conversion engine contained in a base program or application program performs conversions based upon "schemas" contained in one or more secondary programs, such as plug-ins. Optionally, the schemas describe each format in which the current and previous versions of the plug-in read and write data. The conversion engine optionally identifies the source and target schemas and outputs a streamed representation of the persistent data in a format compatible with the current version of the secondary program.

5 Claims, 3 Drawing Sheets

SCHEMA-BASED FILE CONVERSION

BACKGROUND

This invention relates to electronic systems and methods for converting persistent data in a file from one format to another.

The need frequently arises to read and interpret data that was stored in an incompatible format by a different version of a program. For instance, successive versions of database software are often called upon to read, interpret and modify data stored by earlier versions of the same software package. Other application programs implement multiple secondary programs, such as plug-ins, which are updated from time to time with new versions having more features and greater functionality. However, a problem arises if data written by an old plug-in is in a format that is incompatible with the current version. In such circumstances, the application or plug-in must be equipped with a conversion engine capable of reading and converting persistent data stored in the old formats. Alternatively, an application can be required to save data in a previous format so that an older version of the application can read it. That procedure is often called "reverse" or "backward" conversion.

Some conversion procedures rely on format numbers appended to each block of persistent data. The format number reflects the version of the plug-in that wrote the persistent data. When a document is opened, the format of each plug-in used to create the document is compared with the current plug-in format number. If the numbers are different, it is known that the document was written, at least in part, by an old version of a plug-in. Accordingly, the format of the data cannot be compatible with the current version of the plug-in. In such a situation, a conversion procedure is executed to make any necessary modifications to the format of the persistent data.

Some application programs include conversion managers that search for a conversion engine contained in the current plug-in that is capable of converting the data from the source to the target format. More specifically, the conversion managers rely upon the plug-in's conversion service to read the input stream in the source format, modify the data's format, and emit a data stream in the target format. If the source document includes packets of persistent data written by multiple plug-ins, multiple conversions can be required. Sequential conversion can be required where, for instance, the persistent data must be converted from a first generation format to a third generation format and the conversion service is not capable of performing a direct conversion. Rather, the conversion service can first convert the data stream from the first to second generation format and then from the second to third generation format.

Some protocols permit complex conversions, but involve time-consuming preparation of customized conversion services. Each time the data format changes, plug-in developers must create and incorporate additional conversion service code that is compatible with the application program's conversion manager. Creation of the conversion service code is particularly costly and difficult because it must be capable of reading and converting all previous formats in which the plug-in outputs persistent data streams.

Most conversion services also suffer from the weakness that interior objects cannot be easily located in a source data stream. Moreover, conversion services are often unable to modify efficiently the formats of such interior objects.

Because of the effort required to write conversion service code, some developers have instead decide to create code capable of dynamically handling multiple formats "on-the-fly." However, this approach greatly complicates creation of code for the procedures carried out by the plug-in.

SUMMARY

In general, in one aspect of the invention, a conversion engine contained in a base program or application program performs conversions based upon "schemas" contained in one or more secondary programs, such as plug-ins. In particular implementations, the secondary programs can contain a set of schemas that describe the format in which each version of the secondary program outputs data. A conversion algorithm in the base program can assess the differences between the schema associated with the source data and the target schema associated with the current version of the secondary program. The conversion algorithm can generate a streamed representation of the persistent data in a format compatible with the current version of the secondary program.

In another aspect, each file can contain data written by one or more persistent implementations such as plug-in programs called by an application program. The files can include format information, such as a format number, that directly identifies or is otherwise associated with the version of the plug-in or other secondary program that wrote each packet of persistent data.

In an additional aspect, the current version of the secondary program can contain a set of schemas which describe not only the format in which the current version outputs data but also the output format of each previous version of a plug-in. The schemas can optionally identify the number, names, order and types of fields in a persistent data array. By comparing two schemas, the differences in format between an old version's data and the current version's data can be ascertained.

In a further aspect of the invention, a base program compares format information contained within the source data with format information in a current secondary program to determine whether the source data was written by the current version or a previous version of the secondary program. If the source data was written by a previous version, the base program can compare the schema associated with the source data with the current schema and identify the differences between the two formats. An engine included in the base program can read the source data and perform a conversion by a method that accounts for the identified differences in format by adding, deleting, modifying, or reordering data fields. The base program can be configured so as to output a streamed representation of the persistent data in the current format as the source data is converted.

The details of one or more embodiments of the present invention are set forth in the accompanying drawings and the description below. Other features, objects, and advantages of the present invention will be apparent from the description and drawings, and from the claims.

BRIEF DESCRIPTION OF THE DRAWINGS

Like reference numerals in the various drawings indicate like elements.

DETAILED DESCRIPTION

Figure 1:
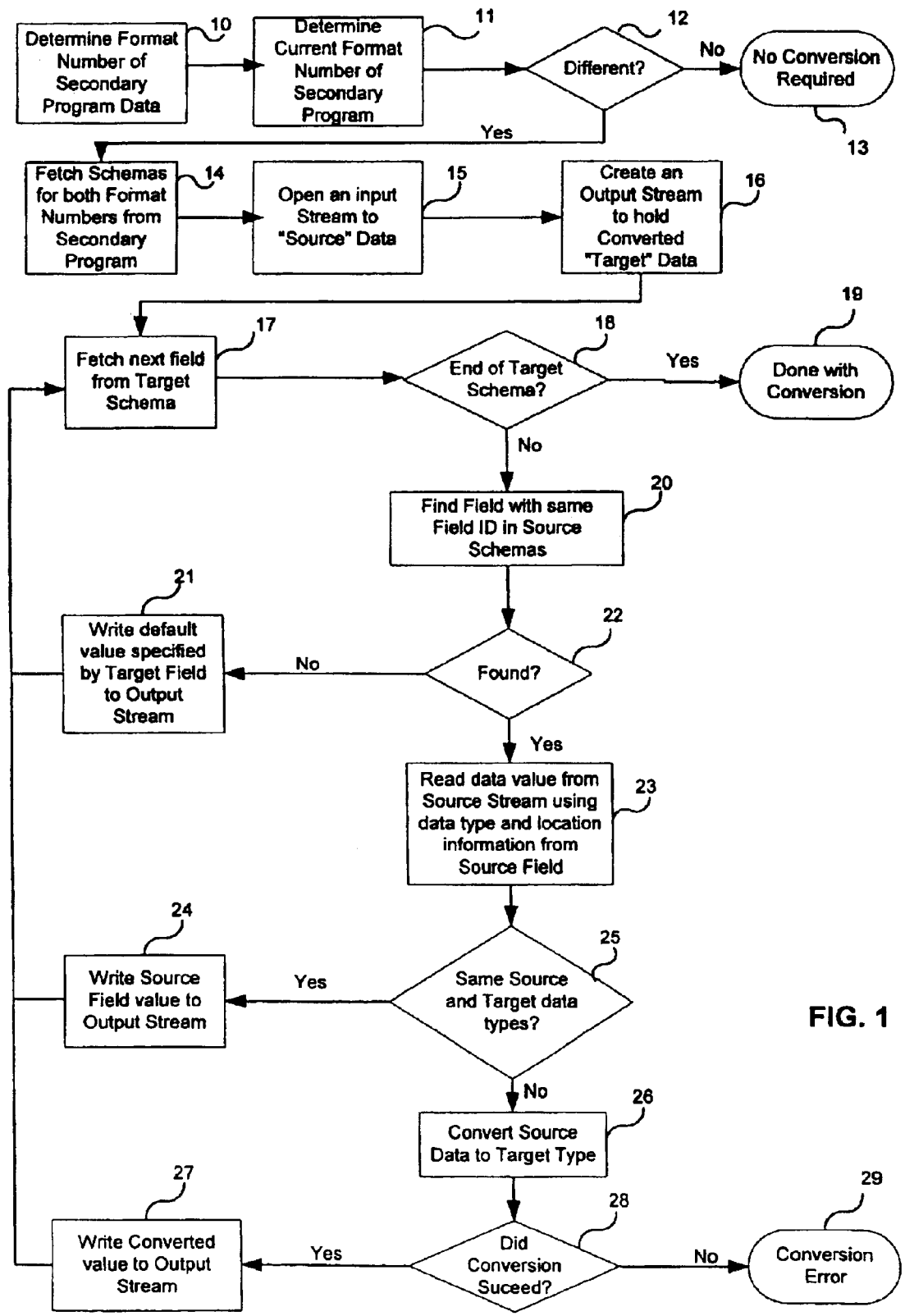
FIG. 1 is a flow diagram illustrating the overall flow of control among the various procedures used in a schema-based file conversion.

As shown in FIG. 1, a conversion manager in a base or primary program, e.g., an application program such as a browser, word processor, or graphics program, identifies a format number of the current version of a secondary program, e.g., a plug-in such as a PostScript® file viewer, Flash™ player, or editors for databases, text, tables or images (step 10). The format number reflects the format in which the plug-in reads and writes persistent data in the primary program's files. The conversion manager then identifies the format number associated with a set of persistent data which must be read and/or implemented by the primary program (step 11). If the two format numbers are the same, the conversion manager determines that the persistent data was written by the current version of the plug-in and that no conversion is required (steps 12, 13).

If the numbers are different, the conversion manager identifies "schemas" contained in the current version of the plug-in (steps 12, 14). The schemas delineate the formats associated with both format numbers (step 14). The conversion manager then opens an input stream to the source persistent data (step 15) and an output stream into which the data will be written after format conversion (step 16). The conversion manager identifies the first field in the target schema, i.e., the schema for the current plug-in version (steps 17–18). The conversion manager then finds the corresponding field in the source schema, i.e., that which describes the format in which the persistent data was written (steps 20, 22), and begins reading the source data according to the source schema (step 23).

If the source schema and target schema describe the same data type for a given field, then the source data value is written directly to the output stream (steps 24, 25). Otherwise, the conversion manager converts the source data to the format described in the target schema (step 26) and writes the converted value to the output stream (steps 28, 27). Illegal conversions (step 29) are addressed in more detail hereinbelow.

The format numbers can be ordered by time. They need not be sequential, but it is advantageous for each new version of the data to have a higher number than the one that preceded it. Alternatively, some of the format numbers can be ordered according to particular versions or applications of a given plug-in.

The schemas used in the procedure of FIG. 1 can be more particularly described as an ordered set of field definitions that describe a secondary program's data for a specific format number. In the implementation of FIG. 1, each field describes a single data element and appears in the schema in the same order that the secondary program reads or writes the data on a data storage medium. A "schema set" is the collection of schemas that describe all of the data format numbers for a specific secondary program. The schema set, ordered by format number, completely defines how the persistent data has changed over time.

Each field can have a unique ID that distinguishes it from all other fields in the same schema set. If a data item appears in both Format A and Format B, it is can advantageously be given the same field ID. That in turn enables the conversion engine to determine that it is the same data item. If a data item is deleted from the secondary program data, the associated field ID should not be reused. Otherwise, the conversion engine cannot be able to identify absent data items unless additional procedures are implemented. Newly added data items should similarly be given a field ID that has never been used before.

Figure 2:
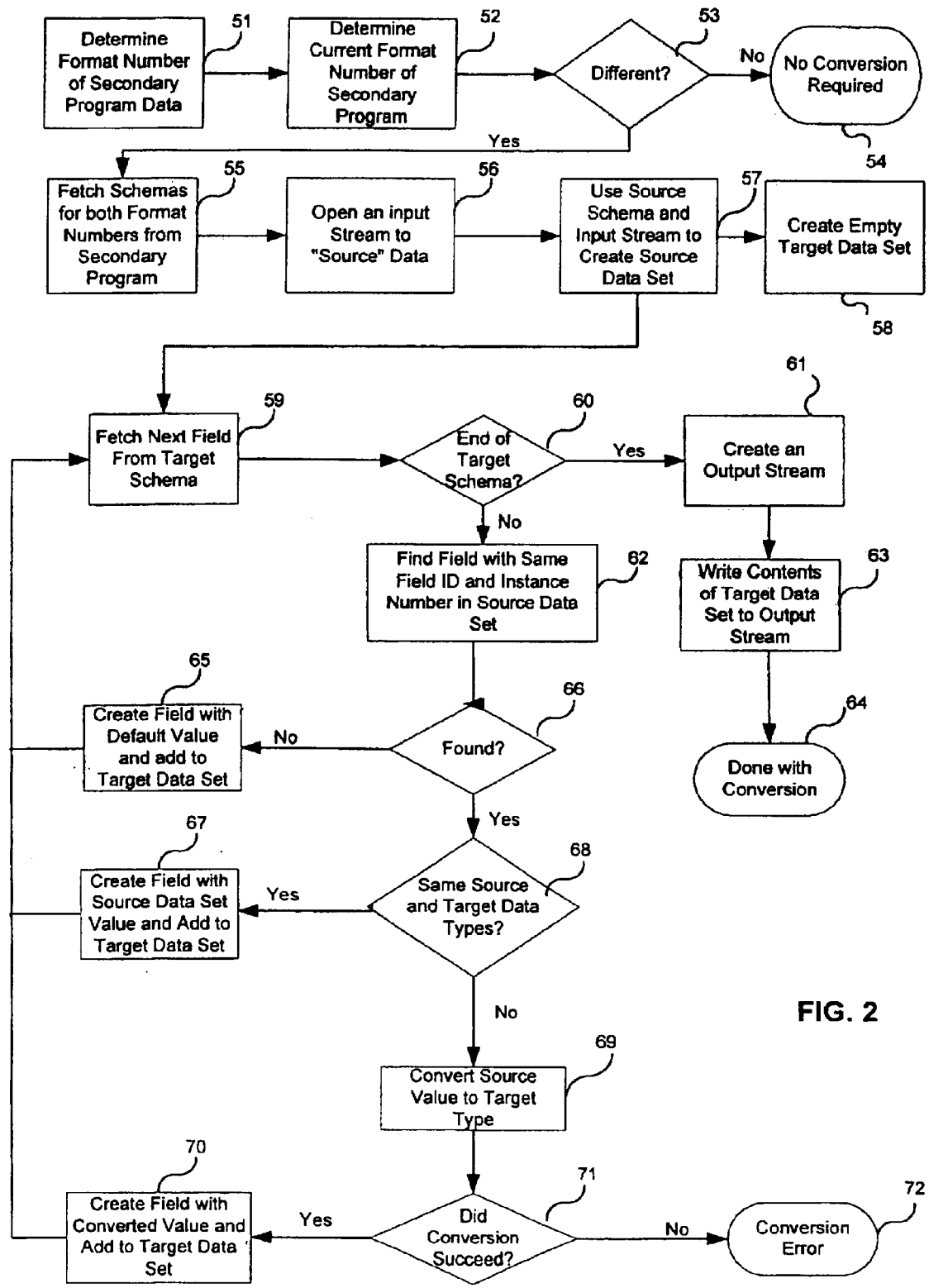
FIG. 2 is a flow diagram illustrating the overall flow of control among the various procedures used in a used in a schema-based file conversion wherein the persistent data contains one or more repeating blocks of values or arrays of fields.

FIG. 2 illustrates a modified procedure in which field arrays are implemented. Steps 51–56 mirror steps 10–15 described above in connection with FIG. 1. In step 57, a source data set is created. The source data set includes a set of fields ordered in parallel with the source schema fields. For each schema field, a corresponding data set field is created (step 58). The data set field's value is read from the input stream (steps 56, 57). Since the source schema's field order matches the order of the stream data and the data type of each schema field is known, this process is straightforward. If the field is "simple," as for example an integer or a real number, a single value is read from the input stream. However, the source data can include groups of fields or an "array of structures."

the implementation of FIG. 2, the field array is preceded by a count of the number of array elements. This element count ('n') the stream is interpreted by the conversion engine as an instruction to process the block of schema field definitions that comprise the array 'n' times. However, if a field is part of an array that is replicated 'n' times in the data set, the same field ID will appear 'n' times. This problem can be solved by generating an instance number for each data set field (step 62). For fields that are not part of an array, the instance number is simple '1'. For array elements, the instance number is the array index value. In other words, it will range from 1 to 'n'.

Implementations that allow nested arrays can be configured to support hierarchical instance numbers from the form a.b.c. where 'a' is the outermost index value and 'c' is the innermost. If the target schema field is not an array, the instance number will be '1' and processing is straightforward. If the field is an array, the conversion engine processes each array element 'n' times using unique instance numbers (steps 65–71). Each field definition includes a field ID, data type, and a defaualt value to be used if the field cannot be found in the source data set. Optionally, the schemas define which data type conversions are allowed and which are illegal. The conversion engine can advantageously include a type translator that will perform valid conversions and detect attempts to perform invalid ones (step 69). The engine can advantageously be used to write each field's data value to the output stream, starting with the first field in the target data set (step 63).

Figure 3:
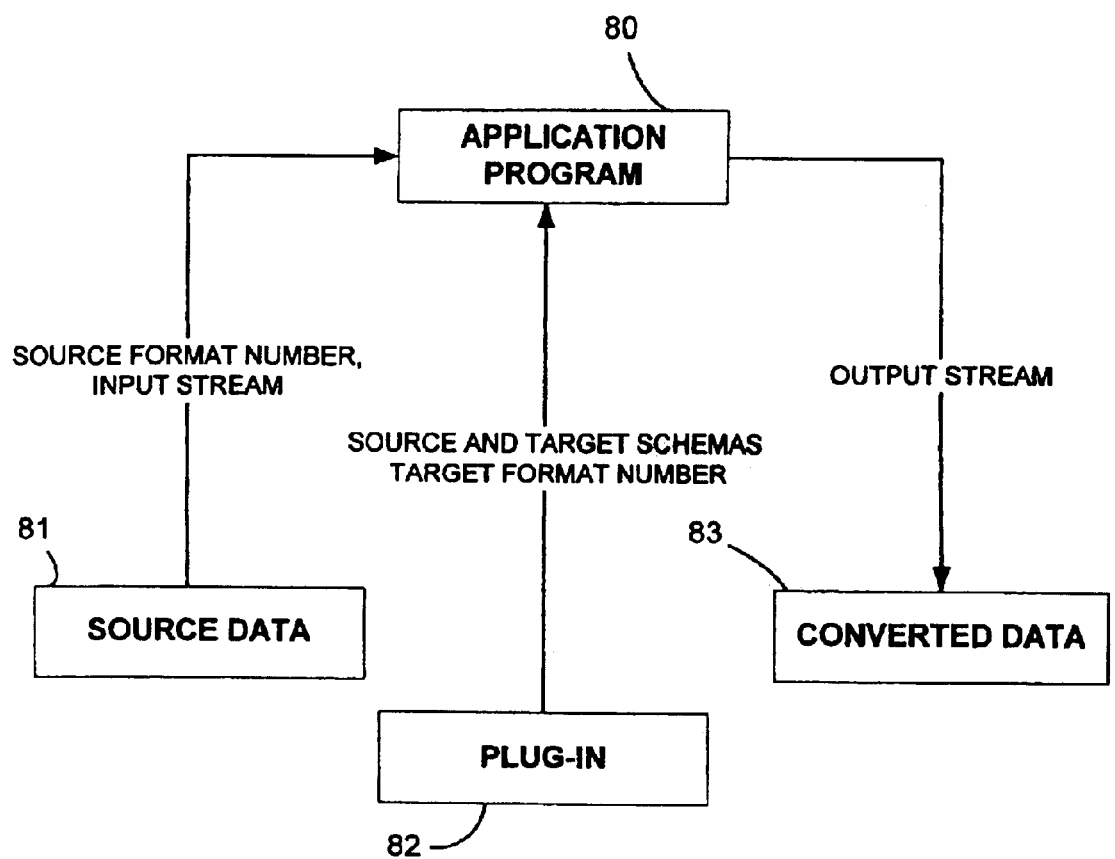
FIG. 3 is a block diagram illustrating schema-based file conversion using a base program and a secondary program.

FIG. 3 is a block diagram illustrating an advantageous software system for executing schema-based file conversions. A conversion manager in an application program 80 identifies the format number of the current version of a plug-in 82. The conversion manager then identifies the format number associated with persistent source data 81. The conversion manager compares the two format numbers and thereby ascertains whether the source data was written by plug-in 82 or an early version of that plug-in. If necessary, the conversion manager contained in application program 80 reads the source and target schemas contained in plug-in 82. The conversion manager then opens an input stream to the source persistent data 81 and an output stream via which the converted or target data 83 will be written after format conversion. The actual format conversion is executed in the manner set forth above in connection with FIG. 1.

The schema-based conversion systems of FIGS. 1–3 can be implemented by programming the conversion manager in the primary program to recognize and implement a conversion service in one or more secondary program. Next, the secondary program is modified to include a set of schemas that define the past and present formats of persistent data written into a file by the secondary programs.

The conversion manager can be programmed to recognize the schema-based conversion service by adding a module to the plug-in. An exemplary module definition is as follows:

```
define module SchemaConversionProvider of type ConversionService
{
   interface IID ICONVERSIONPROVIDER
   implemented by class SchemaBasedConversion;
}:
```

A Directive resource can be added to the application program to accommodate the removal or addition of an implementation to or from a module. Doing so permits the schema-based converter, described in more detail below, to generate new data with appropriate default values, or to entirely remove obsolete data from the file.

If a plug-in has gone through multiple revisions or releases, multiple schemas can be supplied. For instance, if a plug-in has been upgraded over time from versions 1.0 to 1.5 to 2.0 and the format of first implementation remained constant, the format of a second persistent implementation changed in version 1.5 only, and the format of a third implementation changed in both version 1.5 and version 2.0, five schemas are needed. The schema can be designated A1.0, B1.0, B1.5, C1.0, C1.5 and C2.0. Generally, a plug-in developer need only define one schema for each format in which a persistent implementation has stored data. When the service is called upon to convert a version 1.0 document, the following conversions will occur: B1.0→B1.5 and C1.0→C2.0. Each schema can describe the format of one persistent implementation. All schemas associated with persistent data written by any version of given plug-in can advantageously be contained within the current version of the plug-in. Such an arrangement provides an implicit definition that all schemas defined in a plug-in are intended to be used in converting previous formats associated with that plug-in.

An exemplary schema is set forth below:

```
define schema FooFormat 1.0
{
   implementation is class Foo
   format number is 1.0
   {
     field 0x0001 type is integer 16 default value is 0
   }
}:
```

Each schema describes the layout of the data for some format of some implementation; The field's type is a 16-bit signed integer, and its name is 0x0001, and its default value is zero. Field names can be non-zero 16-bit unsigned integers. Optionally, #define constants can be used for field names. In the implementations described above, it is important that each field have a unique name and that names not be reused if fields are deleted. Names must be unique among the schemas that describe different formats of the same implementation. For example, implementation A can have a field named 0x0001, and Implementation B can also have a field named 0x0001, but must identify the same field in different formats of A.

The schemas can be readily modified to accommodate revisions in an implementation. As an example, the aforementioned Foo implementation can be modified so as to include a real number, widen the integer to 32 bits, and add a boolean flag preceding the existing integer. The schema should be modified as follows:

```
#define kFooCounter 1
#define kFooFlag 2
#define kFooScale 3
define schema FooFormat 1.5
{
   implementation is class Foo
   format number is 1.5
   {
     field kFooFlag type is boolean default value is true
     field kFooCounter type is integer32 default value is 0
     field kFooScale type is real default value is 1.1
   }
};
```

Descriptive names have been added due to the number of fields and each field takes a different type of default value.

A conversion manager can execute a conversion based upon the foregoing schema. Because each field has a name, the converter is able to determine that kFooFlag was added in front of the existing kFooCounter. It is also able to determine that kFooCounter needs to be converted from a 16-bit to a 32-bit integer. If an illegal conversion is attempted, such as real number to point, the attempt will fail and the document will not be converted. If the input data was "42" in the above example, the output will be "true, 42, 1.1."

A Directive resource can be required when a module is created or removed, an implementation is added to or removed from a module, a module is moved from one plug-in to another, or an implementation is moved from one plug-in to another. Directives serve several purposes, including deletion of data from a document when a module or implementation is removed, and creating new data with appropriate default values when necessary. An exemplary Directive resource is set forth below:

```
define Directive
{
   remove module SomeModule at format number 1.2
   add implementation PersistentBoolData
     to module DocumentModule at format number 2.0
   remove implemenation MyData
     from module MyModule at format number 2.1
   add module NewModule at format number 3.0
   add implementation NewData
     to module NewModule at format number 3.0
   move module NewModule at format number 3.2
     to plugin BettPlugin at format number 3.1
};
```

The resource holds a list of individual Directives that define the history of the plug-in's modules and implementations. Multiple individual Directives can be contained within a single Directive resource. Alternatively, multiple Directives can be defined. The Directive set forth above provides that module SomeModule was completely removed from the document at format number 1.2; at format 2.0 implementation PersistBoolData was added to module DocumentModule; implementation MyData was removed from module MyModule at format 2.1; at format 3.0 a new module (NewModule) was added with a single implementation (NewData); at format 3.2 NewModule and NewData were moved to a different plug-in (BetterPlugin). When reverse conversions are executed, the add module and add implementation Directives indicate data removal. In an advantageous implementation, all Directive types are needed to keep the document contents up-to-date.

Schema can optionally define array fields instead of multiple, separate fields. For example, where an implementation contains three boolean flags followed by four 32-bit integers, the schema can comprise either seven separate fields or two array fields. The latter approach is illustrated below:

```
#define kBarOptions 1
#define kBarValues 2
define schema BarFormat10
{
   implementation is class Bar
   format number is 1.0
   {
      field kBarOptions type is array of boolean
         default value is (true,false,false)
      field kBarValues type is array of integer32
         default value is (0,0,0,0)
   }
};
```

The number of default values statically determines the number of elements in each array. The set of default values is enclosed in parentheses.

A field array can be used where the number of array elements is dynamic and where the data is comprised of an array of structures rather than of single elements. A field array is a type of field, like a simple boolean or integer. The following field array can be used in connection with the foregoing Bar implementation where that implementation is modified so that a value is associated with each flag and the number of flag-value pairs is dynamic.

```
#define kBarPairs 1
#define kBarOption 2
#define kBarValue 3
define schema BarFormat10
{
   implementation is class Bar
   format number is 1.0
   {
      field array kBarPairs count is integer 16 default value is 0
      {
         field kBarOptions type is Boolean default value is false
         field kBarValues type is integer32 default value is 0
      }
   }
};
```

The schema contains only one field. The field's type is field array and its name is kBarPairs. Following the field's name is its iteration count, which has a type but not a name because it is an attribute of the field array. It has a default value of zero. The iteration count immediately precedes the iterated values. Each iterated field has a type, name and default value. The default value is not used unless the iteration count has a non-zero default. In the example shown above, the output stream would simply be "0". If the default iteration count was 2, the output would be "2, false, 0, false, 0." The counter can be a signed or unsigned integer that is 8, 16 or 32 bits wide. It can also be a boolean, which means that the array elements are included either zero or one time.

It is sometimes necessary to change a plug-in's format number even though nothing was substantively altered. In such a circumstance, a "null conversion" can be performed so that the document is updated with the new format number. For example, a plug-in with a format number of 3.2 can contain Implementation A, which has schemas for formats 1.0 and 2.3, and Implementation B, which includes a single schema for format 1.0. If the format number is changed to 4.0, the conversion service must provide a means to convert format 3.2 to 4.0, else a conversion failure will occur. This can be advantageously and effeciently accomplished by defining a SchemeFormatNumber resource:

```
define schemaformatnumber
{
   format number 4.0
};
```

This resource will cause the schema-based converter to generate a null conversion from the next-lowest format number of each implementation for format 4.0. In the foregoing example, it will convert A2.3→A4.0 and B1.0→B4.0. Note that the SchemaFormatNumber resource can contain more than one format number.

The schema conversion service can be hybridized to include one or more traditional code-based conversion services. This permits the conversion manager to utilize schema-based conversion where appropriate and code-based conversions where necessary. Each conversion service is placed in a separate module. Advantageously, all conversions from one given format to another given format can be handled by the same conversion service. In other words, one converter can handle converting format 1.0 to 1.5 for several different implementations. The other is responsible for conversion from format 1.5 to 2.0 for the same set of implementations.

In hybrid conversion services, care must be taken to ensure that the code conversions are not skipped because the schema conversion service appears to have accounted for differences in format. For instance, if a schema conversion service performs conversions 1.0→2.0, 2.0→3.0 and 4.0→5.0 and an integrated code conversion service performs conversion 3.0→4.0, the schema conversion service can attempt to perform conversions directly from format 1.0 to format 5.0, effectively skipping the code conversion from 3.0→4.0. This problem can be circumvented by providing a Directive to define the end of each valid schema and code conversion sequence. The following Directives will permit the schema conversion service to generate direct conversions only up to format 3.0, but no further.

```
define Directive
{
   end of schema range at format number 3.0
   end of code range at format number 4.0
};
```

This Directive groups all schemas below and including format 3.0 in one set and all those above 4.0 are in another. It causes the schema conversion service to perform conversions 1.0→3.0 and 4.0→5.0, instead of 1.0→5.0. The net effect is that the schema conversion service converts format 1.0 to format 3.0, the code conversion service converts format 3.0 to format 4.0, and, finally, the schema conversion service converts format 4.0 to format 5.0.

Reverse conversions can be performed to save documents in a previous format. In an advantageous implementation, every conversion requires identification of the source and target format numbers for each plug-in. The document is the source and the running version is the target. For a reverse conversion, the source format number is provided by the running plug-in. The target format number is determined by the conversion manager by querying the conversion service to determine the format number associated with the format in which the persistent object was written. Thereafter, the above-described algorithm can be applied to identify the associated schema and perform the conversion. The product version is identified by one of the constants defined in a Product Version resource. For schema-based conversions, all that need be provided is an additional resource such as:

```
#define kSherpa 1
#define kAnna 2
define productversion
{
   version kSherpa at format number 1.3
   version kAnna at format number 4.2
};
```

This particular resource enables the conversion provider to determine that the plug-in used format number 1.3 in the release designated Sherpa and 4.2 in the release designate Anna. Each release of a plug-in can advantageously include an updated version of this resource so as to ensure that reverse conversions will be performed accurately.

While FIGS. 1 and 2 illustrate particular implementations of a schema-based conversion method, the technique of the invention can be advantageously implemented in a variety of other ways. For instance, the conversion technique can be implemented in connection with other secondary programs that write persistent data into a file read by a primary program. Instead of format numbers, other discernable format indicators can be used. Optionally, the conversion engine or manager can be integrated into the secondary program or a suitable resource instead of the primary application program. The schemas applied by the conversion engine can define other known format parameters, and need not be limited to integer and field types. The schemas can be incorporated into the secondary program, the primary program (such as an application program), or any suitable resource. The instant conversion technique can also be implemented in connection with non-persistent objects, including temporary files. Any combination of hybrid conversion techniques can also be implemented, wherein traditional conversion services cooperate to a varying extent with schema-based conversion techniques. The traditional conversion services can be incorporated into the same or different programs or resources as the cooperating schema-based conversion services.

The invention can be implemented in digital electronic circuitry, or in computer hardware, firmware, software, or in combinations of them. Apparatus of the invention can be implemented in a computer program product tangibly embodied in a machine-readable storage device for execution by a programmable process; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for file conversion comprising:
   providing a main application program including a conversion engine;
   providing a plug-in that writes data associated with a file of the main application program, the plug-in including a set of data format definitions that define the format of the data written by a plurality of versions of the plug-in;
   providing an instance of data that was written by a previous version of the plug-in;
   identifying the previous version of the plug-in;
   accessing the data format definitions for a current version of the plug-in and the previous version of the plug-in;
   inputting the data format definitions for the current version and the previous version of the plug-in to the conversion engine; and
   converting the instance of data with said conversion engine to a format corresponding to the data format definition for the current version.

2. The method of claim 1, wherein the object data format definitions comprise an ordered set of field definitions.

3. The method of claim 1, wherein the object data format definitions comprise array fields.

4. The method of claim 1, wherein identifying the previous version of the plug-in comprises identifying a format number associated with the instance of data.

5. The method of claim 1, further comprising accessing the data format definitions for an additional version of the plug-in and converting the instance of data first to a format corresponding to the data format definition for the additional version of the plug-in and then converting the instance of data to a format corresponding to the data format definition for the current version.

* * * * *